April 30, 1968   F. R. KLING ET AL   3,380,176
SELF-CORRECTING EDUCATIONAL DEVICE, GAME
AND ASSOCIATIVE DISPLAY
Filed June 2, 1966
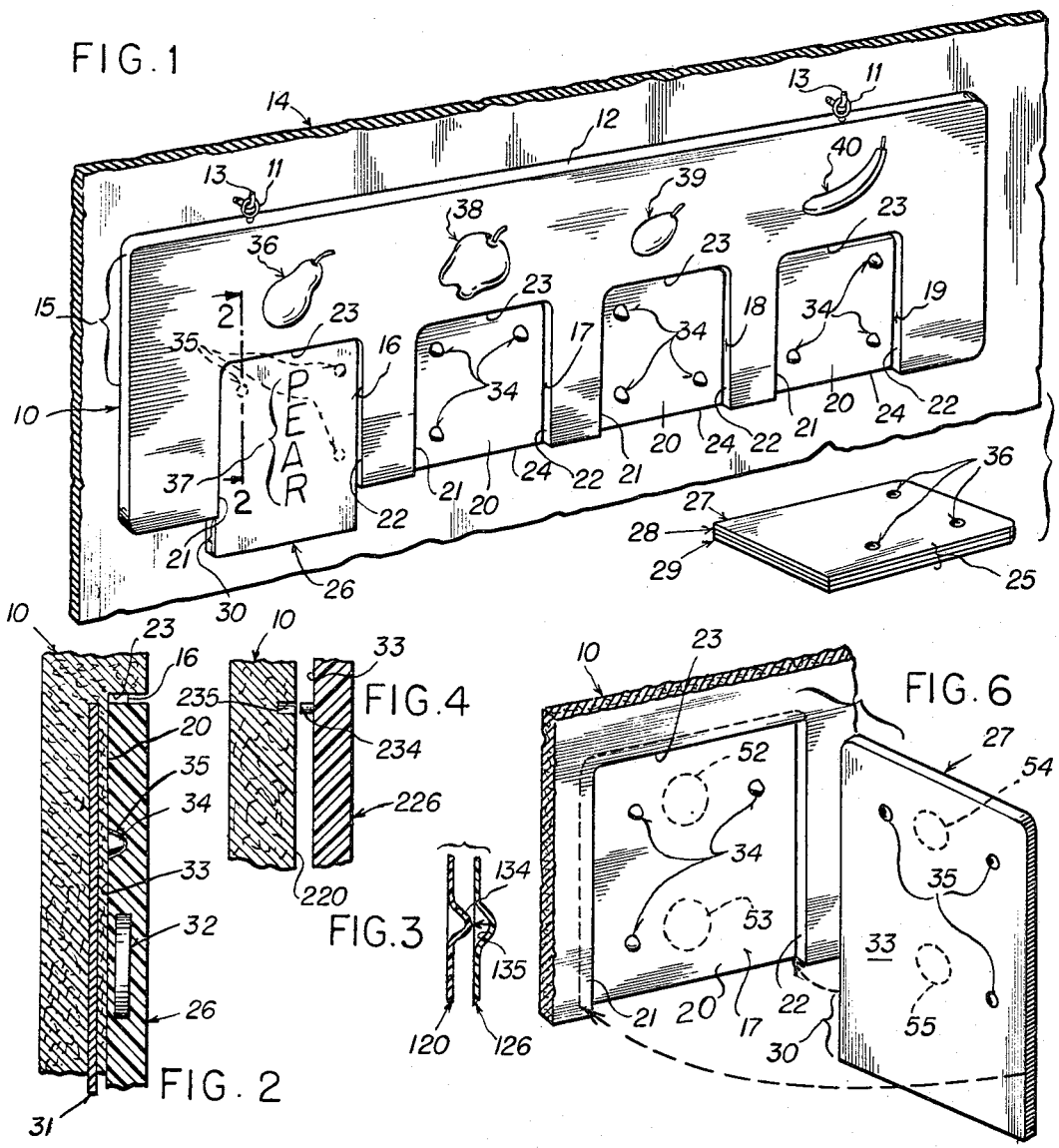
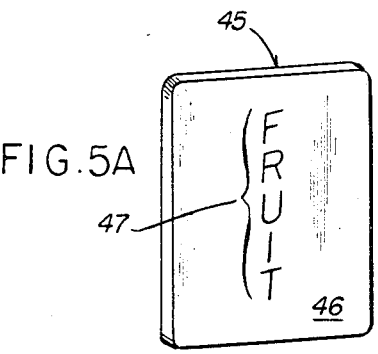

United States Patent Office 3,380,176
Patented Apr. 30, 1968

3,380,176
SELF-CORRECTING EDUCATIONAL DEVICE, GAME AND ASSOCIATIVE DISPLAY
Frederick R. Kling, Point Pleasant, Pa., and Robert Serrell, Princeton, N.J., assignors to Educational Testing Service, Princeton, N.J., a corporation of New York
Filed June 2, 1966, Ser. No. 554,892
9 Claims. (Cl. 35—9)

ABSTRACT OF THE DISCLOSURE

An educational and game device in which a base structure having a face for disposition in an upright plane and provided with at least one framed recess has associated therewith a group of separate panels each of which is selectively, loosely receptive in the framed recess, the framed recess having a backwall and an open drop-out bottom side. Paired mutually attractive magnetic elements are fixed in the recess backwall and each panel and provide a magnetic force of sufficient strength to hold the panel in the recess when the back face of the panel is juxtaposed with the backwall, but which is insufficient to prevent drop-out of the panel from the recess if the panel is spaced sufficiently from the recess backwall.

The base structure adjacent the recess is provided with an intelligence symbol and the panels are also provided with intelligence symbols but the symbols on only certain of the panels relate with that on the base structure to convey a meaningful message. The backwall of the framed recess and the back face of each panel are provided with protuberances and cavities which are arranged in coded pattern providing that only protuberances and cavities of the backwall and those certain panels which cooperate to convey a meaningful message interfit thereby allowing said certain panels to be received in the recess with the back face closely juxtaposed with the backwall.

---

The present invention relates to educational devices for teaching students intelligence associations and for testing their proficiencies in various fields of knowledge, which may be employed for amusement if desired. Specifically it relates to such devices which feature a base structure which may carry intelligence means and having one or more receptive areas for ready placement of loose and separate panels and for selective retention of certain of these panels carrying related intelligence means which in interrelated associations convey intended certain messages or information of guidance.

It is an object of the present invention to provide a unique and desirable improvement of such a device which is especially effective in implementing the purpose of the device, for example to substantiate and confirm correct associations of intelligence while at the same time preventing incorrect associations.

Another object of the invention is to provide such an improved device which embodies a base structure intended for upright disposition or support featuring at least one such panel-receptive area in the form of an upright framed recess having an open drop-out bottom side through which may be rejected a loose panel placed therein that is not matchingly coded to the framed recess by patterned physical interengaging means.

Still another object of the invention is to provide in various forms of the improved device a combination of mutual magnetic holding attraction of panels to base structure and such physical coded interengagement thereof which in mismatching of the latter so weakens the mutual field of magnetic attraction as to bring about automatic rejection that informs the operator of improper mismatching.

The invention accordingly comprises the features of construction, combinations of elements, and arrangement of parts, which will be exemplified in the constructions hereinafter set forth.

Other objects of the invention will in part be obvious and will in part appear from reference to the following detailed description taken in connection with the accompanying drawing wherein like numerals identify similar parts throughout, and in which:

FIG. 1 is a front elevational perspective view of an embodiment of the present invention showing suitable supporting construction for mount of the base structure of the device in an upright position with the latter having a plurality of framed recesses adapted respectively to receive one of a plurality of shown panels as may be dictated by related intelligence means carried by the base structure and the panels;

FIG. 2 is an enlarged sectional detail taken substantially on line 2—2 of FIG. 1, with parts broken away;

FIG. 3 is a sectional detail of physical coding means, with parts broken away, which may be employed in recess backwall and associated panel constructions of modified form of the invention;

FIG. 4 is a sectional detail of portions of associated base and panel constructions, with parts broken away, showing another modified form of physical coding means of this invention;

FIG. 5A is a perspective view of the front side of a panel coded to match all receptive recesses of the base structure shown in FIG. 1;

FIG. 5B is a perspective view of the back side of the panel shown in FIG. 5A; and FIG. 6 is a perspective exploded view of a framed recess of certain base structure of the present invention and a panel unit supportable therein, both of which are provided with mutually matching patterned holding means in the form of coded magnetic means and also coded physical interengaging means.

It will be seen from FIG. 1 that an embodiment of the present invention includes a base structure 10 which may be in the form of a substantially flat board of suitable material, such as wood, fiberboard, plastic composition having a reasonable degree of rigidity, etc., and which may be transparent or of any desired degree of opacity. In accordance with the present invention such base structure 10 is to be supportable in an upright position and, for this purpose, may have a plurality of laterally-spaced screw eyes 11 fastened or mounted to its top edge 12 which may be engaged by hooks 13, or other suitable supporting elements, anchored in a supporting structure 14 that may be in the form of a portion of a vertical wall construction.

The base structure board 10 may be provided with a longitudinally-extending top lateral zone 15 with the lateral section therebeneath provided with a plurality of framed recesses 16, 17, 18 and 19, each having an upright backwall 20 circumscribed by opposed and laterally-spaced side edges 21 and 22 and a downwardly-facing top edge 23. Each of the framed recesses 16, 17, 18 and 19 is shown, by way of illustration, as being substantially rectangular in transverse configuration, but it is to be understood that such transverse configuration may be any one of a large variety of polygonal shapes or curvilinear formations. The backwall 20 of each of the framed recesses 16, 17, 18 and 19 has a plurality of relatively smooth and glide-promoting areas at distributed points which are located generally in a common upright plane and, for this purpose, may be provided together by a substantially smooth and flat surface, or, if desired, such areas may be intervened by cavities, holes, projections, channels, etc. Each of the framed recesses 16, 17, 18 and 19 has an open drop-out bottom side 24 which may be provided by omission of a defining edge wall or, if desired, may be in the form of a downwardly sloping edge that will not provide a supporting ledge for a loose panel that is receptive in such recess.

FIG. 1 shows in association with the base structure 10 a stack 25 of three loose panels 27, 28 and 29, and another 26 thereof which has been removed from this stack and positioned in the framed recess 16 for support therein in the manner hereinafter indicated. Each of the loose panels 26, 27, 28 and 29 may be of any suitable planar construction, such as a sheet of molded plastic, compressed fiberboard and the like, and of such transverse configuration as to be loosely receptive in any one of the framed recesses 16, 17, 18 and 19 in certain relative orientation with the back face thereof provided with a plurality of relatively smooth and glide-promoting areas at distributed points also located generally in a common plane for juxapositioning to the recess backwall 20. In the absence of certain panel-supporting means of the present invention each such panel 26, 27, 28 and 29 is capable, when inserted in one of the recesses 16, 17, 18 and 19 of sliding down out of the open drop-out bottom side 24 of such recess. As will be seen in FIG. 1 each of the panels 26, 27, 28 and 29 is of a height appreciably greater than any of the recesses 16, 17, 18 and 19 whereby the bottom zone or end section 30 (see panel 26) extends appreciably below the open drop-out bottom side 24 of the recess to provide an extending manually engageable pull tab on the bottom portion of such panel to facilitate ready insertion in every recess and so that if it is properly supported in a particular recess, such as 16, by holding means of the present invention it may be readily freed manually therefrom by the operator when such tab portion is pulled outwardly away from the recess.

As will be more fully understood from FIG. 2 the base structure 10 may be provided with magnetic means or material in the area of the backwall 20 of any of its recesses 16, 17, 18 and 19 which may be in the form of a sheet 31 of paramagnetic material, such as black iron or dead steel, and the like preferably hidden from view by embedding. Such sheet of paramagnetic material may extend laterally completely through the base structure 10 from side to side, so that sections thereof underlie the recess backwalls 20. Each of the panels 26, 27, 28 and 29, such as panel 26 a portion of which is illustrated in FIG. 2, is provided with suitable complementary magnetic means or material which may be in the form of one or more permanent magnets 32 embedded therein and preferably hidden from view, such as by the degree of opacity of the panel material. The section of the iron sheet 31 which is embedded beneath the backwall 20 of framed recess 16 and the permanent magnet 32 constitute a pair of mutually attractive magnet means, one of which is a paramagnetic body (a section of embedded iron sheet 31) and the other of which is a magnetic field source (permanent magnet 32), but it is to be understood that such paired mutually attractive magnetic means may be in the form of permanent magnets embedded in properly opposed relation in the backwall 20 of each recess and in the inserted panel.

The strength of the field of magnetic force, or the magnetic flux, linking together the permanent magnet 32 and, the opposed section of paramagnetic sheet 31, and the relative spacings thereof, when panel 26 is fully nested in framed recess 16 with areas of the panel back face 33 abutted or juxtaposed to areas of the face of the recess backwall 20, are such that the linking magnetic force either will hold the panel in its upright position within the recess alone without tendency to drop out, or will tend to do so effectively to attain the desired secure support when suitably supplemented by physical interengaging means of the present invention.

As will be understood from FIGS. 1 and 2 such physical interengaging means may be in the form of a plurality of protuberances, which may be in the form of pins 34, provided on the face of the recess backwall 20 in a certain pattern of relative spacing and distribution, and each such pattern is coded by its particular arrangement which differs from that provided on the backwall of each of the other recesses. The back face 33 of the panel 26 which is to be properly supported in the framed recess 16 is provided with a plurality of spaced cavities or indentations 35, arranged in a similar coded pattern of distribution, and each of which preferably is complementary in shape to one of the pins 34 in which the latter will nest with the panel back face 33 opposed in abutting relation to the surface of the recess backwall 20.

For a better understanding of the matching coded patterns of interfitting physical means, i.e., the pins 34 and receptive cavities 35 respectively carried by the recess backwall 20 and the panel back face 33, one may consider that each rectangular recess shown in FIG. 1 features four locations, i.e., position "one" in the vicinity of the upper left hand corner, position "two" in the vicinity of the upper right hand corner, position "three" in the vicinity of the lower right hand corner, and position "four" in the vicinity of the lower left hand corner. It will thus be seen that recess 16 and its matched panel 26 have the interfitting pins 34 and cavities 35 thereof located in the coded positions "one," "two" and "three"; recess 17 and matched panel 27 have these interfitting elements located in the coded positions "one," "two" and "four"; recess 18 and matched panel 28 have these interfitting elements located in the coded positions "one," "three" and "four"; and recess 19 and matched panel 29 have these interfitting elements in the positions "two," "three" and "four." Consequently, when panel 26 is inserted in framed recess 16, with its cavities 35 having pins 34 nested therein in the first matching coded pattern, the panel back face 33 abuts the surface of the recess backwall 20 to provide a field of magnetic lines of force linking the magnetic means comprising permanent magnet 32 and the paramagnetic sheet 31, which may be of such strength as to tend to hold this panel in this particular recess. The interengagement of the pins 34 in the cavities 35 supplement such holding power by coded physical support. However, if panel 26 is inserted, by way of example, in framed recess 17 the pin 34 in position "four" will have its nose bearing against the back face 33 of the panel to space it in this area from the surface of the recess backwall 20 the height of such pin, and although the pins 34 in positions "one" and "two" may be aligned with cavities 35 in such positions there will not be complete nesting since the transverse top edge of the panel will bear against the recess backwall along a line of hinging action. This will weaken the mutual or effective linking magnetic field therebetween to a degree as to permit such misplaced panel 26 to drop out of such framed recess 17 through the open drop-out bottom side 24 with the smooth glide-promoting areas of the back surface 33 sliding over the rounded pin noses. This action of rejection due to such mismatching or non-mating of the patterns of the coded physical supporting means becomes more effective if the relative locations of the pins and cavities are such as to space the panel back face 33 from the surface of the framed recess backwall 20 a like distance at all points equal to the heights of the pins. Relative sliding action is enhanced by the particular shape of the surfaces of the pins 34 and cavities 35, which, as will be best understood from FIG. 2 is of a camming nature due to the conoidal (more specifically the parabolic conoidal) shape of the surfaces of the pins and complementary cavity walls. In a practical embodiment of the invention, such as the form shown in FIGS. 1 and 2 it may be preferred that at least four such pins and complementary cavities be employed in each matched pair of framed recess and panel and with each such pairing having its own particular coded pattern of arrangement.

The base structure 10 carries, in association with each of its framed recesses 16, 17, 18 and 19, and each of the front faces of the panels 26, 27, 28 and 29 carry related intelligence means which in proper interrelated association conveys an intended certain message or desired information. For example, the base structure top zone 15 may bear above framed recess 16 a certain symbol, which may be in the form of a pictorial representation 36 that identifies a particular object, such as a pear fruit. The outer face of panel 26 may then bear suitable symbolic means, such as letters spelling the word "PEAR," as is illustrated at 37 in FIG. 1. With the coded pattern of cavities 35 in the back face 33 of panel 26 being arranged in the same coded pattern of protuberances or pins 34 carried by the backwall 20 of framed recess 16 this panel will be securely anchored in this recess when the panel is inserted therein, and the symbolic word "PEAR" carried by the panel will match the pictorial symbol 36. In like fashion the zone 15 of the base structure 10 above the framed recess 17 may bear a pictorial representation 38 of an apple and panel 27 may have its outer face provided with the word "APPLE." The pictorial representation 39 of a plum above the framed recess 18 may be matched by the symbolic word "PLUM" on the outer face of the panel 28. In similar fashion the symbolic representation 40 of a banana above the framed recess 19 may be matched by the symbolic word "BANANA" carried on the outer face of the panel 29. Thus the base structure, and at least certain one of each of these panels, carries related intelligence means, which in interrelated associations by insertion of such certain panel in the particular recess conveys an intended certain message which not only provides to the operator an amount of correct information in an educational sense, but which may also in the matching afford to the operator a sense of satisfaction in accomplishing the correct matching to serve as a feature of a game or plan of amusement, and, if desired, such correct matching may be assigned a certain value of game scoring.

It is to be understood that it is not necessary to the practice of the present invention to have the intelligence means provided as a permanent and unchangeable feature of the base structure or of each panel. The invention may be practiced in a form wherein either of the base structure and panels, or both, are initially blank, and wherein the intelligence means may be affixed by pasting, inserting or direct writing or drawing, and subsequently removed to permit reuse of the device with new intelligence means applied thereafter. Also, the provisions of the intended messages are not limited solely to vertical associations of intelligence means on the base structure with intelligence means on a matching panel, but alternatively may comprise or may include horizontal associations of intelligence means on several panels when arrayed in their respectively matching frames as, for example, successive letters in a word or successive words in a sentence.

Further, it is not necessary to the practice of the present invention to have the base structure 10 provided with a number of framed recesses which is equal to the number of the group of separated panels provided. The invention may be practiced in a form wherein the base structure has only one such framed recess with a group of panels differing chiefly in the coding of the physical interfitting means, so that all but one or several of the panels will be rejected by the recess and with the single correct panel or each of the several correct matching panels being readily held in the inserted position by such coding.

It will be seen from FIG. 3 that the backwall of each such framed recess may be in the form of a relatively thin cover sheet 120, which has its localized projection provided as a molded protuberance 134 that desirably may be in the shape of a paraboloid. This backwall facing sheet 120 may be anchored in any suitable manner in the framed recess, such as by cementing it therein in fixed position. In such embodiment the panel 126 may be in the form of a relatively thin sheet of molded plastic which is provided with its localized cavity 135 in the molding operation, and with this cavity being shaped complementary to the projection 134 for receptive interfitting. The molding of such cavities 135 in relatively thin panel cards will permit readily aligned stacking of similarly coded cards of different groups.

It will also be seen from FIG. 4 that such interfitting protuberances and cavities or localized projecting pins and receptive indentations need not, in the practice of the present invention, be respectively provided on the framed recess backwall and in the back face of the matching panel. As is therein illustrated, the recess backwall 200 may be provided with a cavity in the form of a cylindrical hole 235 which will receive a cylindrical pin or stud 234 projecting from the back face 33 of the panel 226. When there is employed such form of coded physical interfitting means that are not characterized by opposed camming surfaces, as are provided by the parabolic conoidal pins 34 and complementary shaped cavities 35, theer is a more secure physical anchorage which will require a somewhat different disengaging action. In structures featuring such cylindrical interfitting holes 235 and pins 234 disengaging action may include an initial lifting away of the panel from the framed recess backwall followed by the rejecting dropout action, or lift of the bottom edge of the panel out of the recess may hinge the panel about its top edge for such disengagement.

Embodiments of the present device may be employed to teach the one-many associations of the intelligence means carried on a single panel or card with intelligence means carried on the base structure. For example, the panel or card 45 illustrated in FIGS. 5A and 5B may be associated with the base structure 10 of FIG. 1, for selective reception and support in any one of the recesses 16, 17, 18 and 19 of the latter. For this purpose the face 46 of panel 45 may bear at 47 the symbolic word "FRUIT" which identifies a broad class of plant products encompassing the specific fruits illustrated at 36, 38, 39 and 40 in FIG. 1. The back face 48 of the panel 45 carries a composite coded pattern of four of the cavities 35 matchable with each of the several coded patterns of proturberances 34 of the framed recesses 16, 17, 18 and 19 of the FIG. 1 base structure, thus permitting the confirmation of a correct association of the symbolic word "FRUIT" on the front face 46 of the panel 45 with each of the pictorial symbols 36, 38, 39 and 40 on the base structure 10. Variations of this technique will readily occur to one skilled in the art also to provide, through suitable coding, master cards with coding matching the complementary coding of any desired subset of frames in the base structure.

While embodiments of the present invention described above have not required a matching coding of paired magnetic means it is to be understood that embodiments of the present invention may incorporate, in addition to the matching coding of the physical interfitting means in the form of the interengaging pins and cavities, matching coded patterns of the paired mutually attractive magnetic means. For example, as is illustrated in FIG. 6, a framed recess, which may be similar to that illustrated at 17 in FIG. 1, may have the coded arrangement of conoidal pins 34 there shown (i.e., in positions "one," "two" and "four") with the matching panel 27 provided with the like coded pattern of cavities 35. Within the backwall structure 20 of the framed recess 17 may be embedded in concealed fashion magnetic bodies 52 and 53, e.g., of paramagnetic material, located at particular points as shown. The panel 27 may be provided with complementary mutually attractive magnetic means which may be embedded in concealed fashion within the body of the panel, e.g., permanent magnets 54 and 55, which will lie in opposed relation to the paramagnetic bodies 52 and 53 when this panel is inserted in this framed recess with interengagement of the pins 34 in the panel cavities 35. Thus, the paired mutually attractive magnetic means of the various embodiments of the present invention may be either uncoded, as in the form of FIGS. 1 and 2, or coded as in the form of FIG. 6, but in all such forms the interfitting physical supporting means, such as the interfitting pins and cavities, will be in matching and mismatching coded patterns, respectively, to attain the supported panel matching and unsupported and rejecting mismatching. The use of the coding of such interfitting protuberances and receptive cavities increases the number of coding patterns available and facilitates greatly the proper action of the device in unmistakably rejecting incorrect panels and also in firmly anchoring and holding the correct panels in their properly matched framed recesses despite jarring of the device. The magnetic attraction afforded by the paired mutually attractive magnetic means, whether coded or uncoded, is particularly helpful to advantageous use of embodiments of the device in connection with educational programs for children because of the mysterious character of the action of such magnetic holding and supporting means which supplements the action of the coded physical interfitting elements. Four or more of the coded protuberances may be preferable to a smaller number, but at least three widely and suitably separated such physical supporting means will assure secure steady placement of each panel in any such recess without undue tilting of the panel therein whenever there is mismatching of the coding of such physical holding means.

The term "framed recess" is used herein in the sense of a generally flat panel or card-receptive base surface area of certain transverse configuration delineated along at least a major portion of the margins thereof (or, more specifically, the top and opposite sides thereof when such surface area is arranged generally in an upwardly extending plane) by projecting means, such as ledges, sidewalls, tabs, posts, etc., which will confine placement of a panel or card of certain transverse configuration and relative dimensions substantially to such area while permitting lift out of the panel or card in a normal direction or drop away in the upright plane through the bottom side thereof when the latter is open. The term "paired mutually attractive magnetic means" is used herein in the sense of a pair of means capable of readily conducting magnetic flux so that they can be linked together by the lines of force of a magnetic field when mutually subjected to the influence of the field, and may include a cooperative pair of bodies one of which may be of paramagnetic material and the other of which may be a permanent magnet, or both of which may be permanent magnets relatively oriented in mutually attractive fashion. "Intelligence means" as employed herein includes within the scope thereof visually identifiable ocular items, signs, symbols, letters, numerals, pictorial representations and other observable markings, as well as those that may be recognized by the tactile sense, which when associated in certain relationships will convey to the observer or manipulator of the device intended messages or certain information.

Various embodiments of the educational and game device of the present invention are featured by coded patterns of interfittable physical means comprising complementary matable projecting and receiving portions defined on the pair of opposable faces provided by the recess backwall and the back side of any certain panel which upon insertion in this recess will be temporarily retained therein. Such receiving portions of the coded interfittable physical means as are carried by either of this pair of opposable faces intervene some of the glide-promoting areas of this face and the same is true with respect to those portions carried by the complementary opposable face. The mating of the coded patterns of projecting and receiving portions respectively carried by these faces of this opposable pair, upon insertion of the proper panel in this base structure recess, allows close juxtapositioning of these opposed faces and of the mutually attractive magnetic means of the recess backwall and the panel coded thereto in the opposed holding relation. This particular panel which is coded to this certain base structure recess is one of a group of separate panels with others thereof carrying intelligence means unrelated to that associated with this particular base structure recess. The back faces of these other panels are provided with other coded patterns of such matable portions which are of seeming similarity to those carried by the back side of the certain panel which is coded to this particular recess, and these matable portions of these other panels are likewise intervened by glide-promoting areas. However, the coded portions of these other panels are arranged in patterns that are non-matable with the complementary coded portions carried by the face of this certain base structure recess, so that the projecting portions carried by one of the recess backwall face and the back face of any such other non-mating panel will abut opposed glide-promoting areas of the other opposable face for spacing the magnetic means of such other non-mating panels from the magnetic means of this recess backwall, upon insertion of any of these other non-mating panels in this recess, sufficiently to weaken the mutual magnetic field therebetween to a degree permitting drop out by force of gravity of any such other non-mating panels. Such complementary matable projecting and receiving portions defined on the pair of opposable faces of the recess backwall and the panel back side preferably are in the form of spaced protuberances on one of the opposable faces and receptive cavities carried in the other of these opposable faces, both arranged in similar patterns for mating reception of the protuberances in the cavities. The term "cavities" is employed in the broad sense of areas in which there is an absence of solid material in one of the opposed and paired base recess backwall and panel back face structures, at least in the space that may be occupied by an opposed mating protuberance when such paired base and panel structures are juxtaposed to mutual abutment at least in certain other opposed substantially flat surface areas thereof; and it is intended to include within its scope localized or laterally extended indentations, recesses and holes (such as both through and blind bores or sockets), channels, grooves, rabbets, and the like, and preferably such spaces of which at least one defining sidewall portion forms a supporting ledge below one or more of the protuberances mated in such cavities. In the broadest aspect of the invention such cavity spaces need not provide such a supporting ledge since one may rely in such a case for proper panel support principally upon the strength of the mutual magnetic attraction which will be weakened sufficiently to permit rejecting gravity drop-out of a panel from a framed recess when mismating intervenes the backwall of the latter and the panel back face with the protuberances to space them apart appreciably with attendant appreciable spacing of the paired magnetic means thereof to effect the necessary magnetic field weakening.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. An educational and game device comprising, in combination,
   (a) a base structure having a face for disposition in an upright plane and provided with at least one framed recess of certain transverse configuration having a backwall for location generally in an essentially upright plane and an open drop-out bottom side,
   (b) a group of separate panels each of such transverse configuration as to be loosely receptive in the recess in certain relative orientation and having a generally planar back face for juxtapositioning to said recess backwall with each such insertable panel being capable under certain unsupported conditions of sliding down out of the open drop-out bottom side of the recess,
   (c) said base structure and at least a certain one of said panels carrying related intelligence means which in interrelated association by insertion of said certain panel in the recess conveys an intended message, wi h the face of said recess backwall and the face of the back side of said certain panel providing a pair of opposable faces,
   (d) paired mutually attractive magnetic means fixedly embodied in the recess backwall and each of said panels for providing when in opposed relation upon juxtapositioning of the back face of any such panel to the face of the recess backwall a field of magnetic force of certain strength tending to hold such panel in the recess, and
   (e) coded patterns of interfittable physical means comprising complementary matable projecting and receiving portions defined on said pair of opposable faces of the recess backwall and the back side of the certain panel with such receiving portions that are carried by either of the pair of opposable faces being flanked by relatively smooth and glide-promoting planar surface areas of this face with such areas being of appreciable extent, mating of said coded patterns of projecting and receiving portions upon insertion of this certain panel in said base structure recess allowing close juxtapositioning of the pair of opposed faces thereof and of the mutually attractive magnetic means of said recess backwall and certain panel in the opposed holding relation,
   (f) others of said panels carrying intelligence means unrelated to that associated with said base structure recess and having their back faces provided with other coded patterns of such portions and flanking surface areas of seeming similarity to those carried by the back face of the first-mentioned certain panel with these coded panel-borne portions being arranged in patterns non-matable with the complementary coded portions carried by the certain recess backwall to be mismatched, whereby projecting portions carried by one of the recess backwall face and the back face of any such other panel will abut opposed glide-promoting areas of the other opposable face for spacing the magnetic means of these other panels from the magnetic means of said backwall, upon insertion of any of these other panels in said recess, sufficiently to weaken the mutual magnetic field therebetween to a degree permitting initiation of reject drop out by force of gravity of such other panels; said glide-promoting face areas, which are opposed to said projecting portions that space each such mismatched panel away from said recess backwall face sufficiently to weaken the mutual magnetic field therebetween as to effect such drop out initiation, being extended down toward the open bottom side of said recess sufficiently to assure a maintenance of such spacing that attains completion of the drop out action.

2. The educational and game device as defined in claim 1 characterized by said receiving portions carried by one of the pair of opposable faces being in the form of a coded pattern of spaced cavities flanked by the areas of appreciable extent which are relatively smooth and glide-promoting and the complementary matable projecting potrions carried by the other of the pair of opposable faces being in the form of a similar coded pattern of spaced protuberances matingly receptive in the cavities.

3. The educational and game device defined in claim 2 characterized by each of the cavities being in the form of a localized hole circumscribed by a continuous wall with each of said protuberances being a pin matingly receivable in such hole, the mated pins and walls of the holes of the certain panel and the recess in which it is inserted providing panel supporting means to supplement the magnetic holding force of the juxtaposed paired magnetic means to prevent panel drop out.

4. The educational and game device defined in claim 3 characterized by each said pin being in the form of a conoid with its receptive hole being an indentation of complementary shape and size for ready mating insertion and to permit camming disengagement by pull in the general plane of the panel.

5. The educational and game device defined in claim 2 characterized by each said panel being of a height greater than the recess whereby the bottom portion of each panel extends appreciably below the open drop-out bottom side of the recess to provide an extending manually engageable pull projection at the bottom portion of said panel.

6. The educational and game device defined in claim 2 characterized by said base structure providing a plurality of such framed recesses separated from each other with the coded patterns of cavities or protuberances embodied in their backwalls differing from each other, there being in said group of panels at least one sub-group of panels of a number equal to the number of recesses with each panel in this sub-group having a pattern of its protuberances or cavities which mates with the coded pattern of the complementary cavities or protuberances in only a certain one of the recesses to provide an equal number of matching panels and recesses, each matched pair of such panels and recesses having associated therewith the related intelligence means that conveys at least portions of the intended message with such paired panels and recesses differing from pair to pair as to coded patterns of the interfittable physical means thereof and the intelligence means being of a nature such that the combined intelligence means of mismatched pairs of panels and recesses convey no intended messages.

7. The educational and game device defined in claim 2 characterized by said base structure being provided with a plurality of said panel-receptive recesses separated from each other with intelligence means associated with said recesses and carried by said panels in initially blank face areas of said base structure and panels which are of such character as to permit ready manual application thereto by the user in readily removable form the marks defining the intelligence means, thereby permitting reuse of the device by change of the intelligence means.

8. The educational and game device defined in claim 2 characterized by said base structure being provided with a plurality of said panel-receptive recesses separated from each other with differing intelligence means associated with each of said recesses, and the provision of at least one additional panel having a pattern of its cavities or protuberances on its back face which mate with the coded patterns of protuberances or cavities carried by the backwall faces of more than one of said plurality of recesses, said additional panel carrying intelligence means which in combination with the intelligence means associated with each of the more than one recesses separately conveys an intended message.

9. The educational and game device defined in claim 6 characterized by intelligence means carried by said sub-group of panel's cooperatively conveying an intended message when arrayed in proper order with each sub-group panel properly supported and displayed in the plurality of recesses by the respective coded patterns of the interfitting physical means of said recesses and sub-group panels.

References Cited

UNITED STATES PATENTS

| | | | |
|---|---|---|---|
| 142,338 | 9/1873 | Higgins | 35—73 X |
| 1,084,370 | 1/1914 | Smith | 35—73 X |
| 2,415,342 | 2/1947 | Donner | 35—31 X |
| 2,839,843 | 6/1958 | Keyko | 35—35 |
| 2,971,275 | 2/1961 | Provenzano | 35—31 |
| 3,010,228 | 11/1961 | Torre | 35—73 |
| 2,490,092 | 12/1949 | Rippenbein | 35—8 |

EUGENE R. CAPOZIO, *Primary Examiner.*

R. W. WEIG, *Assistant Examiner.*